(12) United States Patent
Ide et al.

(10) Patent No.: US 11,505,972 B2
(45) Date of Patent: Nov. 22, 2022

(54) VEHICLE HOOD LOCK DEVICE

(71) Applicant: Johnan Manufacturing Inc., Nagano (JP)

(72) Inventors: Naoki Ide, Nagano (JP); Harumitsu Nakamura, Nagano (JP); Koji Sasaki, Nagano (JP)

(73) Assignee: Johnan Manufacturing Inc., Nagano (JP)

( * ) Notice: Subject to any disclaimer, the term of this patent is extended or adjusted under 35 U.S.C. 154(b) by 115 days.

(21) Appl. No.: 17/037,838

(22) Filed: Sep. 30, 2020

(65) Prior Publication Data

US 2021/0102411 A1 Apr. 8, 2021

(30) Foreign Application Priority Data

Oct. 4, 2019 (JP) .............................. JP2019-183833

(51) Int. Cl.
*E05B 79/08* (2014.01)
*E05B 85/24* (2014.01)
(Continued)

(52) U.S. Cl.
CPC .............. *E05B 79/08* (2013.01); *B62D 25/12* (2013.01); *E05B 83/24* (2013.01); *E05B 83/243* (2013.01);
(Continued)

(58) Field of Classification Search
CPC .......... E05B 83/24; E05B 79/00; E05B 79/02; E05B 79/04; E05B 79/08; E05B 85/20;
(Continued)

(56) References Cited

U.S. PATENT DOCUMENTS 9,073,457 B2 7/2015 Mueller et al.
9,180,798 B2 * 11/2015 Suzumura ............... E05B 85/26
(Continued)

FOREIGN PATENT DOCUMENTS

CN 103167968 A 6/2013
CN 109236071 A 1/2019
(Continued)

OTHER PUBLICATIONS

Notification of First Office Action dated Jul. 1, 2022 received from the China National Intellectual Property Administration in related application CN 202011050560.X together with English language translation.

*Primary Examiner* — Alyson M Merlino
(74) *Attorney, Agent, or Firm* — Scully, Scott, Murphy & Presser, PC

(57) ABSTRACT

A vehicle hood lock device includes a base including a groove for entry of a striker, a latch that pivots between a restraining position and a release position, a locking lever engaging the latch, a torsion spring causing the latch to pivot in a direction toward the release position, and a sub-plate fixed to the base by a latch pin supporting the latch and a locking pin supporting the locking lever. The torsion spring includes a cylindrical portion. The sub-plate integrally includes a basal portion, a circumferential wall portion rising up from the basal portion in a pivot axis direction of the latch, facing the cylindrical portion in a radial direction thereof and restricting movement of the torsion spring in the radial direction, and a brim portion protruding outward in the radial direction from the circumferential wall portion and restricting movement of the torsion spring in the pivot axis direction.

8 Claims, 10 Drawing Sheets

(51) Int. Cl.
*E05B 83/24* (2014.01)
*E05B 15/04* (2006.01)
*B62D 25/12* (2006.01)

(52) U.S. Cl.
CPC .... *E05B 85/243* (2013.01); *E05B 2015/0437* (2013.01)

(58) Field of Classification Search
CPC ........ E05B 85/24; E05B 85/26; E05B 85/243; E05B 2015/0403; E05B 2015/0406; E05B 2015/0417; E05B 2015/0437; E05B 2015/0441; E05B 15/04; Y10T 292/1047; Y10T 292/1082; Y10S 292/14; Y10S 292/53; Y10S 292/54; Y10S 292/64; Y10S 292/23
See application file for complete search history.

(56) References Cited

U.S. PATENT DOCUMENTS

| | | | |
|---|---|---|---|
| 9,518,409 | B2 | 12/2016 | Shimura et al. |
| 10,494,839 | B2 * | 12/2019 | Makino ............... E05B 15/04 |
| 2013/0307307 | A1 | 11/2013 | Mueller et al. |
| 2013/0328372 | A1 | 12/2013 | Suzumura et al. |
| 2014/0319852 | A1 | 10/2014 | Shimura et al. |

FOREIGN PATENT DOCUMENTS

| | | | | |
|---|---|---|---|---|
| DE | 29716023 | U1 * | 11/1997 | ............ E05B 79/08 |
| EP | 1039079 | A1 * | 9/2000 | ............ E05B 85/26 |
| GB | 2345723 | A * | 7/2000 | ........... E05B 85/243 |
| JP | S60-120169 | U | 8/1985 | |
| JP | 2014-214478 | A | 11/2014 | |
| JP | 2015-096683 | A | 5/2015 | |
| WO | WO-2020193630 | A1 * | 10/2020 | ........... E05B 85/243 |

* cited by examiner

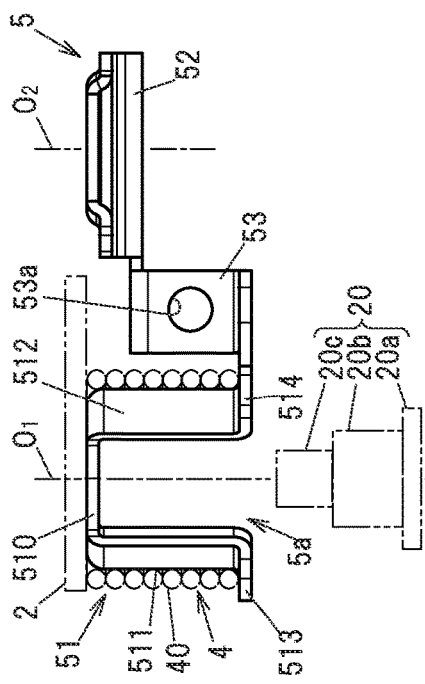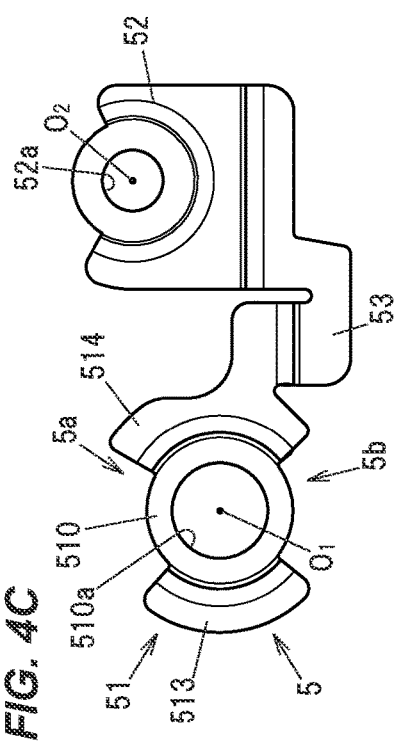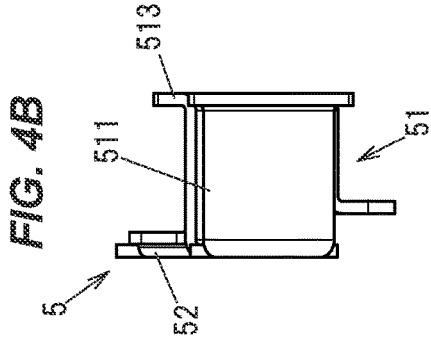

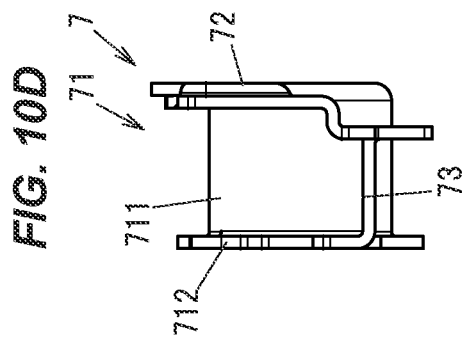
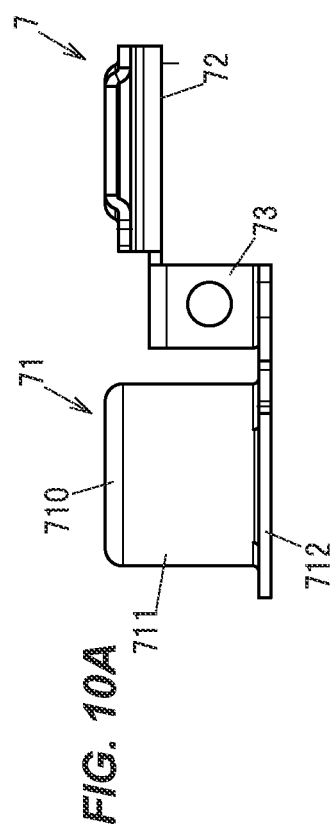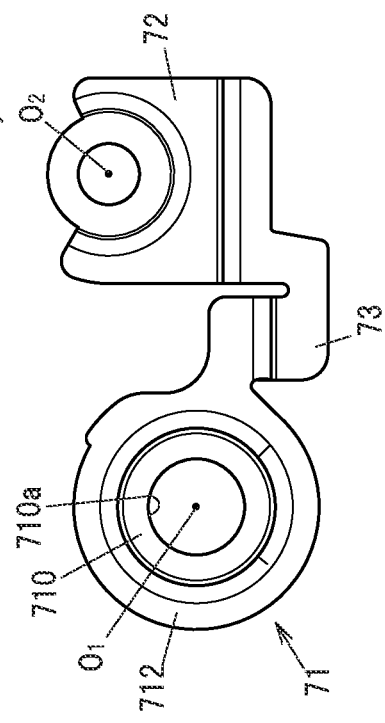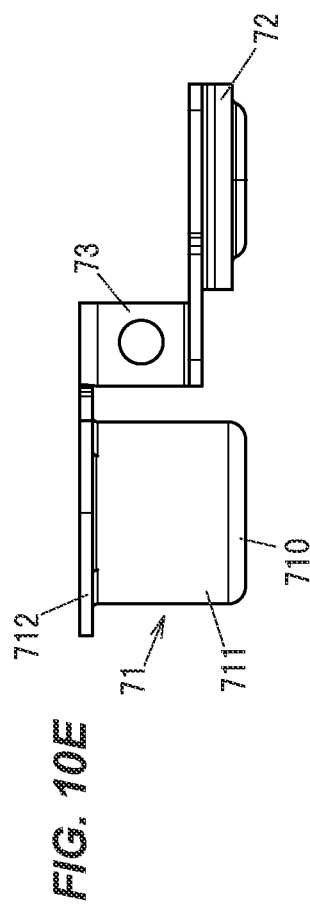
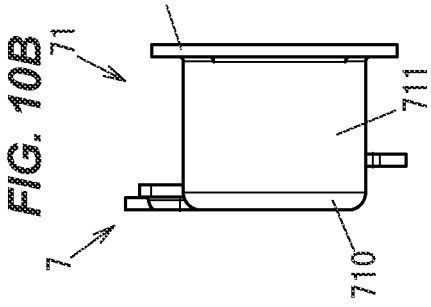
FIG. 10D
FIG. 10A  FIG. 10C  FIG. 10E
FIG. 10B

VEHICLE HOOD LOCK DEVICE

CROSS-REFERENCE TO RELATED APPLICATIONS

The present application is based on Japanese patent application No. 2019-183833 filed on Oct. 4, 2019, the entire contents of which are incorporated herein by reference.

TECHNICAL FIELD

The invention relates to a vehicle hood lock device.

RELATED ART

A vehicle hood lock device is known which is used for locking a hood of a vehicle in a close position thereof (see, e.g., Patent Literature 1).

The vehicle hood lock device disclosed in Patent Literature 1 is provided with a base having an entry groove, a latch which is pivotally supported on the base by a latch pin and pivots between a restraining position, where a striker is restrained, and a release position, where the striker is released, a locking lever (pole) which is pivotally supported on the base by a locking pin and holds the latch in the restraining position, a torsion spring applying a force to the latch in a direction toward the release position, and a sub-plate (a back plate) fixed to the base by the latch pin and the locking pin.

The torsion spring has a cylindrical portion wound in a coiled configuration, and first and second arm portions extended from a main body. The latch pin is inserted into the cylindrical portion of the torsion spring, and the torsion spring is positioned by the latch pin.

CITATION LIST

Patent Literature

Patent Literature 1: JP Utility Model Application Publication No. 60-120169

In the vehicle hood lock device described in Patent Literature 1, the torsion spring is held by the latch pin. Therefore, a problem may arise that the latch pin is large in size to restrict movement of the torsion spring, causing an increase in weight.

SUMMARY OF INVENTION

It is an object of the invention to provide a vehicle hood lock device which can be reduced in weight.

According to an embodiment of the invention, a vehicle hood lock device comprises:
 a base comprising an entry groove for entry of a striker;
 a latch that pivots between a restraining position, where the striker is restrained, and a release position, where the striker is released;
 a locking lever engaging the latch and holding the latch in the restraining position;
 a torsion spring generating an elastic force for causing the latch to pivot in a direction toward the release position; and
 a sub-plate fixed to the base by a latch pin supporting the latch and a locking pin supporting the locking lever so that the latch and the locking lever are sandwiched between the sub-plate and the base,
 wherein the torsion spring comprises a cylindrical portion wound in a coiled configuration and first and second arm portions extended from the cylindrical portion, and
 wherein the sub-plate integrally comprises a basal portion in contact with the latch, a circumferential wall portion rising up from the basal portion in a pivot axis direction of the latch, facing the cylindrical portion in a radial direction thereof and restricting movement of the torsion spring in the radial direction, and a brim portion protruding outward in the radial direction from the circumferential wall portion and restricting movement of the torsion spring in the pivot axis direction.

Advantageous Effect of Invention

According to an embodiment of the invention, a vehicle hood lock device can be provided which can be reduced in weight.

BRIEF DESCRIPTION OF DRAWINGS

FIGS. 4A to 4E are plan views showing the configuration of the sub-plate.

FIGS. 10A to 10E are plan views showing the configuration of the sub-plate in Modification 2.

DESCRIPTION OF EMBODIMENTS (Summary of Embodiments)

A vehicle hood lock device in the present embodiment is provided with a base having an entry groove for entry of a striker, a latch that pivots between a latching position, where the striker is restrained, and a release position, where the striker is released, a locking lever engaging the latch and holding the latch in the restraining position, a torsion spring generating an elastic force for causing the latch to pivot in a direction toward the release position, and a sub-plate fixed to the base by a latch pin supporting the latch and a locking pin supporting the locking lever so that the latch and the locking lever are sandwiched between the sub-plate and the base, wherein the torsion spring has a cylindrical portion wound in a coiled configuration and first and second arm portions extended from the cylindrical portion, and the sub-plate integrally has a basal portion in contact with the latch, a circumferential wall portion rising up from the basal portion in a pivot axis direction of the latch, facing the cylindrical portion in a radial direction thereof and restricting movement of the torsion spring in the radial direction, and a brim portion protruding outward in the radial direction from the circumferential wall portion and restricting movement of the torsion spring in the pivot axis direction.

According to the present embodiment, since it is possible to hold the torsion spring by the sub-plate, it is possible to reduce the size of the latch pin, and as a result, it is possible to reduce the weight of the entire device.

(Embodiment)

The vehicle hood lock device in the present embodiment is to lock and unlock, at a close position, a lid member which opens/close an opening formed on a vehicle body.

Figure 1:
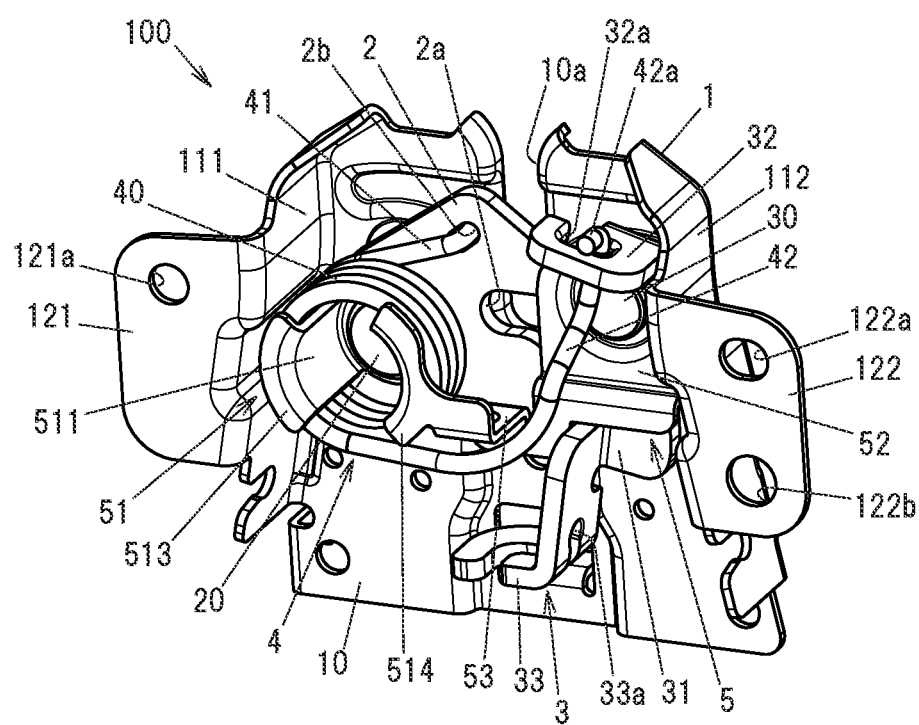
FIG. 1 is a perspective view showing a configuration of a vehicle hood lock device in an embodiment.
Figure 2A:
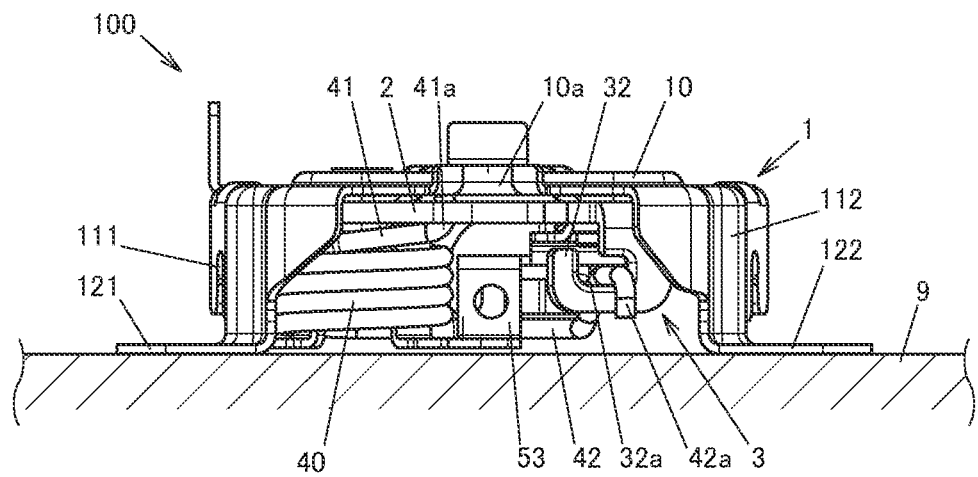
FIG. 2A is a top view showing the vehicle hood lock device.

FIG. 1 is a perspective view showing a configuration of a vehicle hood lock device in the present embodiment when in a locked state. FIG. 2A is a top view showing the configuration of the vehicle hood lock device in the present embodiment when in the locked state and FIG. 2B is a front view showing the configuration the vehicle hood lock device when in the locked state.

In the following description, a direction of entry of a striker 90 into an entry groove 10a (described later) is referred to as a vertical direction, and a direction orthogonal to the vertical direction is referred to as a horizontal direction (the horizontal direction on the paper of FIG. 2B). The horizontal direction corresponds to a vehicle width direction.

Figure 2B:
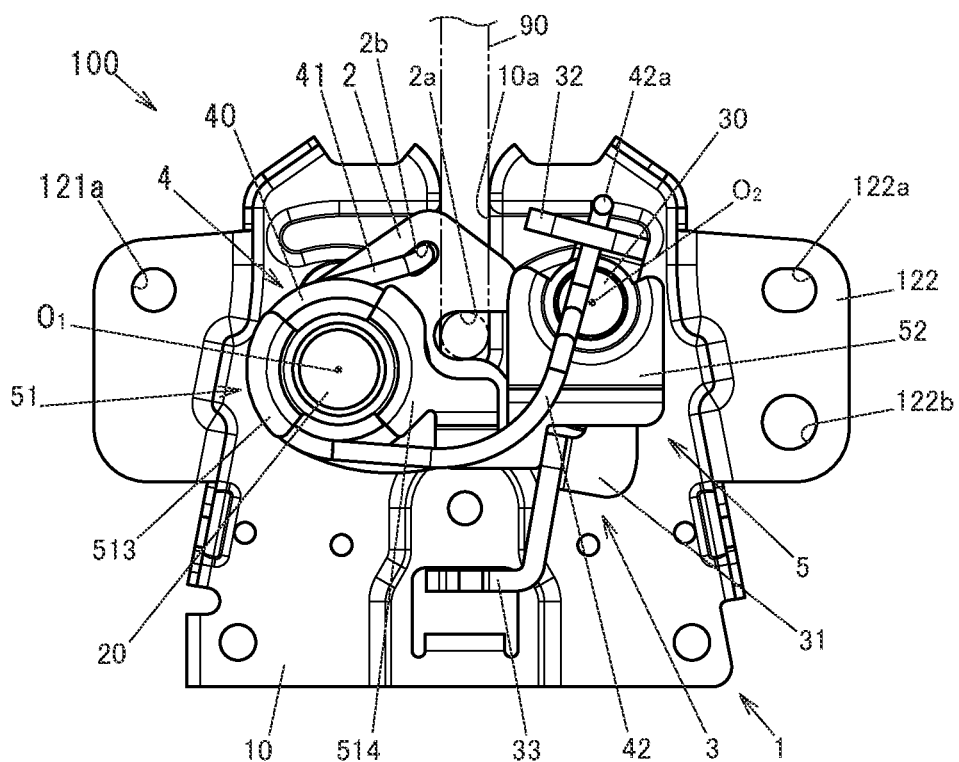
FIG. 2B is a front view showing the vehicle hood lock device.

A vehicle hood lock device 100 is provided with a base 1 fixed to a vehicle body 9, a latch 2 which pivots between a restraining position where the striker 90 is restrained (the position shown in FIG. 2B) and a release position where the striker 90 is released (the position of the latch when pivoted counterclockwise by a predetermined angle from the restraining position shown in FIG. 2B), a locking lever 3 engaging the latch 2 and holding the latch 2 in the restraining position, a torsion spring 4 generating an elastic force for causing the latch 2 to pivot in a direction toward the release position, and a sub-plate 5 covering a portion of the latch 2 and a portion of the locking lever 3.

The base 1 is, e.g., formed of a metal and has a plate shape. The base 1 integrally has a main body 10 having the entry groove 10a for entry of the striker 90, first and second side portions 111 and 112 extending from right and left edges of the main body 10 in a thickness direction of the main body 10, and first and second flange portions 121 and 122 further protruding outward in the horizontal direction respectively from end portions of the first and second side portions 111 and 112. The entry groove 10a is a groove which is formed at the center of the main body 10, has a depth in the vertical direction, and opens upward.

Attachment holes 121a, 122a and 122b for attaching fixing members (not shown) used to fix to the vehicle body 9 are formed on the first and second flange portions 121 and 122.

The latch 2 has a plate shape, is pivotally supported on the main body 10 of the base 1 by a latch pin 20, and pivots about a pivot axis $O_1$ which coincides with the center axis of the latch pin 20.

The locking lever 3 has an elongated plate shape, is pivotally supported on the main body 10 of the base 1 by a locking pin 30, and pivots about a pivot axis $O_2$ which coincides with the center axis of the locking pin 30. The locking lever 3 pivots between a lock position (the position shown in FIG. 2B), where the locking lever 3 engages the latch 2 and holds the latch 2 in the restraining position, and an unlock position (not shown), where the locking lever 3 is pivoted counterclockwise about the pivot axis $O_2$ by a predetermined angle from the lock position and disengages the latch 2.

The locking lever 3 integrally has an elongated plate portion 31 extending vertically, a spring coupling portion 32 located at an upper end of the elongated plate portion 31, and a lock releasing portion 33 located at a lower end of the elongated plate portion 31.

The pivot axis $O_1$ of the latch 2 is located on one side of the main body 10 of the base 1 with respect to the entry groove 10a, and the pivot axis $O_2$ of the locking lever 3 is located on the other side of the main body 10 of the base 1 with respect to the entry groove 10a.

A locking hole 32a for locking an end 42a of a second arm portion 42 of the torsion spring 4 is formed on the spring coupling portion 32 of the locking lever 3. An insertion hole 33a for inserting a release cable (not shown) is formed on the lock releasing portion 33 of the locking lever 3. From the torsion spring 4, the locking lever 3 receives an elastic force in a clockwise pivot direction about the pivot axis $O_2$.

The torsion spring 4 has a cylindrical portion 40 wound in a coiled configuration and first and second arm portions 41 and 42 extended from the cylindrical portion 40. An end 41a of the first arm portion 41 of the torsion spring 4 is inserted through a spring hole 2b formed on the latch 2, and the end 42a of the second arm portion 42 is locked in the locking hole 32a formed on the spring coupling portion 32 of the locking lever 3. That is, the torsion spring 4 generates an elastic force for causing the latch 2 to pivot in a direction toward the release position and an elastic force for causing the locking lever 3 to pivot in a direction toward the lock position. As such, in the present embodiment, since the elastic member is constructed from only a single torsion coil, the number of components is reduced as compared to a vehicle hood lock device using plural elastic members.

The torsion spring 4 is arranged on one side of the main body 10 of the base 1 with respect to the entry groove 10a, and the second arm portion 42 is extended from the one side of the main body 10 to the other side of the main body 10 over the entry groove 10a.

The sub-plate 5 is a member formed of a metal plate, and is fixed to the main body 10 of the base 1 by the latch pin 20 supporting the latch 2 and the locking pin 30 supporting the locking lever 3. In addition, to increase flexural rigidity of the base 1, the sub-plate 5 is attached to the base 1 over the entry groove 10a.

When the vehicle hood lock device 100 is in the locked state, the striker 90 is restrained by the latch 2. The latch 2 engages the locking lever 3 and is held in the restraining position. When an unlock operation is performed, the locking lever 3 is pivoted counterclockwise about the pivot axis $O_2$ by the release cable (not shown). This disengages the latch 2 from the locking lever 3, and the latch 2 which receives the elastic force of the torsion spring 4 pivots counterclockwise about the pivot axis $O_1$ and pushes the striker 90 up. Thus, the striker 90 is released from the latch 2, and the locked state of the vehicle hood lock device 100 is thereby released. In the following description, a direction parallel to the pivot axis $O_1$ is simply referred to as the axial direction, for convenience of explanation.

Figure 3:
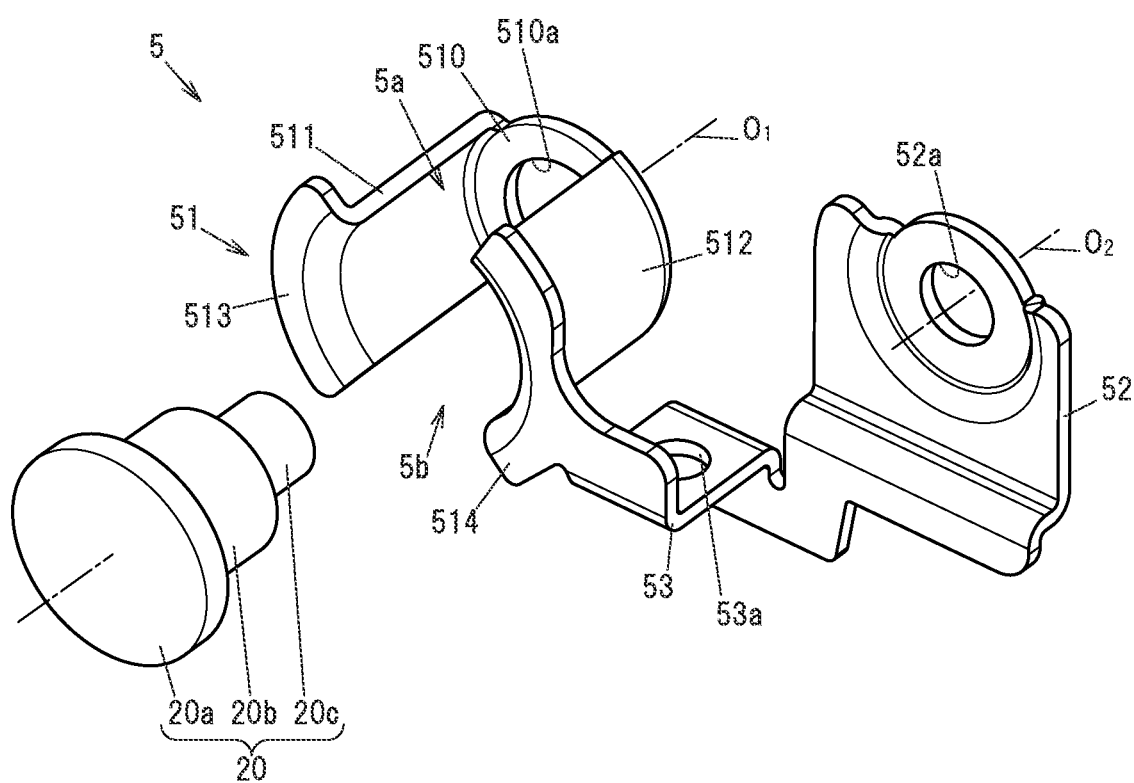
FIG. 3 is a perspective view showing a configuration of a sub-plate.

Next, the configuration of the sub-plate 5 will be described in reference to FIGS. 3 to 4E. FIG. 3 is a perspective view showing a configuration of the sub-plate 5. FIGS. 4A to 4E are plan views showing the sub-plate 5, wherein FIG. 4A is a top view, FIG. 4B is a left side view, FIG. 4C is a front view, FIG. 4D is a right side view and FIG. 4E is a bottom view. In FIG. 4A, the latch pin 20 and the cylindrical portion 40 of the torsion spring 4 are indicated by phantom lines.

The sub-plate 5 integrally has a cylinder portion 51 for holding the cylindrical portion 40 of the torsion spring 4, a flat plate portion 52 to be attached to the locking lever 3, and a coupling portion 53 coupling the cylinder portion 51 to the flat plate portion 52.

The cylinder portion 51 of the sub-plate 5 integrally has a disc-shaped basal portion 510 in contact with the latch 2, first and second circumferential wall portions 511 and 512 rising up in the axial direction from an outer rim of the basal portion 510, and first and second brim portions 513 and 514 protruding radially outward respectively from axial end portions of the first and second circumferential wall portions 511 and 512 on the opposite side to the basal portion 510.

An insertion hole 52a for inserting the locking pin 30 is formed on the flat plate portion 52. The flat plate portion 52 is aligned with the basal portion 510 of the cylinder portion 51 along the horizontal direction, and a contact surface of the basal portion 510 of the cylinder portion 51 in contact with the latch 2 is located in substantially the same plane as a contact surface of the flat plate portion 52 in contact with the locking lever 3.

The coupling portion 53 has a shape of plate which couples a portion of the second brim portions 514 in a circumferential direction of the cylinder portion 51 to a portion of a lower end of the flat plate portion 52. Then, the coupling portion 53 when viewed along the plate thickness direction thereof has a rectangular shape. An attachment hole 53a for attaching a gap prevention member formed of rubber is formed on the coupling portion 53. This prevents a gap between the latch 2 and the striker 90 restrained in a striker engagement groove 2a of the latch 2 and thereby prevents generation of abnormal noise associated with contact between the latch 2 and the striker 90 caused by, e.g., vibration when vehicle is in motion.

The latch pin 20 is a member formed of iron and integrally has a shaft portion 20b passing through through-holes formed on the basal portion 510 of the sub-plate 5 and the latch 2, a head portion 20a provided at one end of the shaft portion 20b and having a larger diameter than the shaft portion 20b, and a small diameter portion 20c provided at an end of the shaft portion 20b on the opposite side to the head portion 20a and having a smaller diameter than the shaft portion 20b. The head portion 20a of the latch pin 20 has an outer diameter smaller than an inner diameter of the cylindrical portion 40 of the torsion spring 4, and is arranged inside a space surrounded, in the radial direction of the cylindrical portion 40, by the first and second circumferential wall portions 511 and 512 of the holding portion 51 of the sub-plate 5.

The shaft portion 20b of the latch pin 20 passes through the though-hole of the latch 2 and a through-hole 510a (described later) of the basal portion 510 of the holding portion 51 of the sub-plate 5, and an axial end face of the shaft portion 20b is in contact with an outer rim portion of a latch hole formed on the main body 10 of the base 1. The small diameter portion 20c of the latch pin 20 passes through the latch hole formed on the main body 10 of the base 1 and a tip portion exposed from the main body 10 of the base 1 is deformed by a compression tool. The latch pin 20 is thereby fixed to the main body 10.

The through-hole 510a for inserting the latch pin 20 is formed on the basal portion 510 of the cylinder portion 51 of the sub-plate 5. The inner diameter of the through-hole 510a of the basal portion 510 is smaller than the outer diameter of the head portion 20a of the latch pin 20 and is larger than the outer diameter of the shaft portion 20b of the latch pin 20.

The first and second circumferential wall portions 511 and 512 are curved along the circumferential direction of the cylindrical portion 40 of the torsion spring 4 and are located inside the cylindrical portion 40. Each of the outer circumferential surfaces of the first and second circumferential wall portions 511 and 512 radially faces, or is in contact with, the inner circumferential surface of the cylindrical portion 40 of the torsion spring 4. This restricts the radial movement of the torsion spring 4. The number of the circumferential wall portions is not limited to two like the first and second circumferential wall portions 511 and 512, and, e.g., three wall portions or four wall portions may be provided. Gaps 5a and 5b are formed between the first circumferential wall portion 511 and the second circumferential wall portion 512 in the circumferential direction.

The first and second brim portions 513, 514 and the latch 2 sandwich the cylindrical portion 40 of the torsion spring 4 in the axial direction. Thus, the axial movement of the torsion spring 4 is restricted.

Figure 5A:
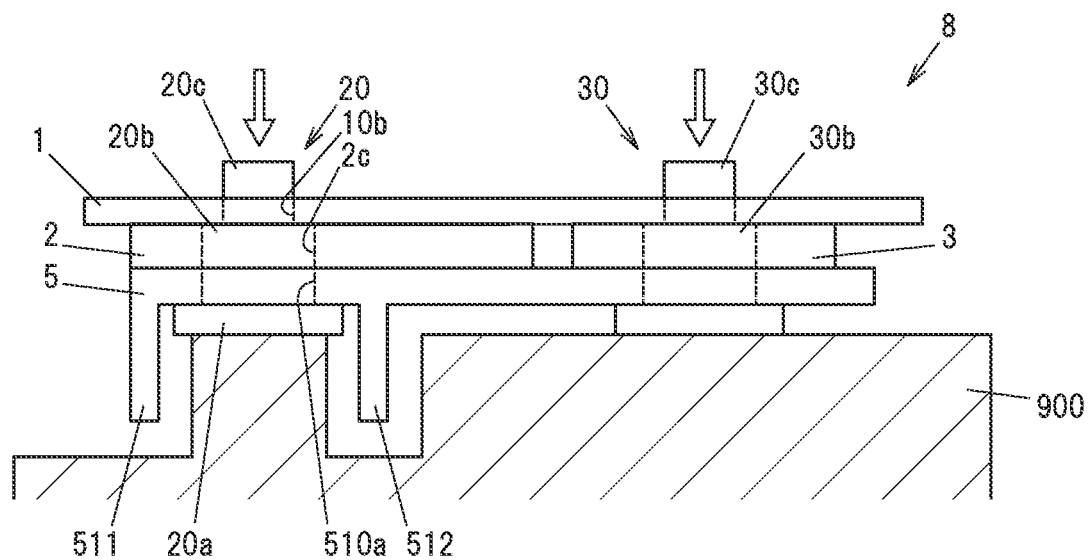
FIGS. 5A and 5B are schematic diagrams illustrating a stacked body which is formed at the time of assembling the vehicle hood lock device.
Figure 5B:
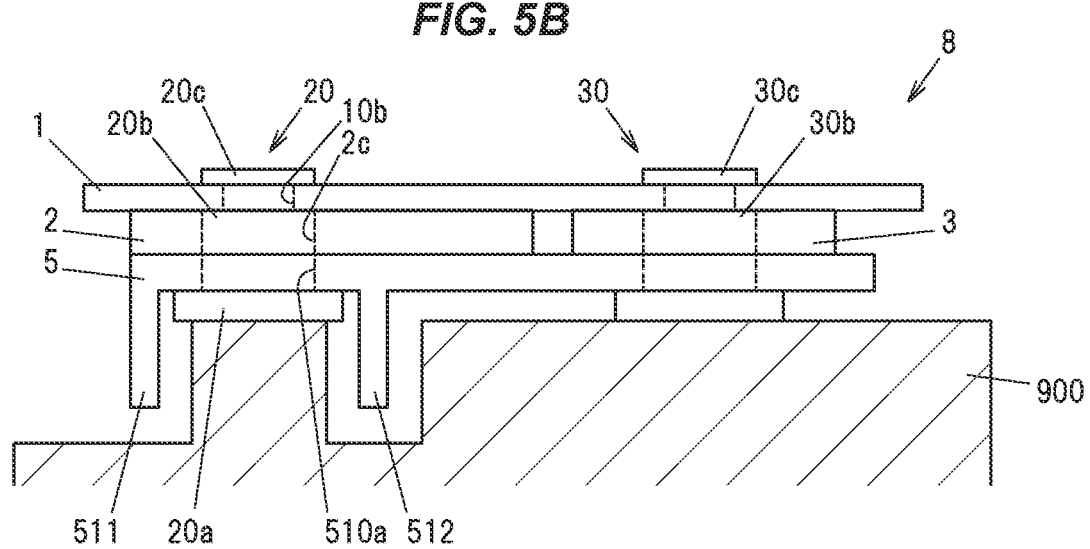

FIGS. 5A and 5B are schematic diagrams illustrating a stacked body which is formed at the time of assembling the vehicle hood lock device 100. In FIGS. 5A and 5B, illustration of the torsion spring 4 is omitted.

When assembling the vehicle hood lock device 100, the base 1, the latch 2/the locking lever 3, the sub-plate 5 and the torsion spring 4 are stacked into a stacked body 8 which is then fixed by the latch pin 20 and the locking pin 30.

As shown in FIG. 5A, the stacked body 8 is formed by stacking so that the shaft portion 20b of the latch pin 20 penetrates through the sub-plate 5 and the latch 2, a shaft portion 30b of the locking pin 30 penetrates through the sub-plate 5 and the locking lever 3, and the small diameter portion 20c of the latch pin 20 and a small diameter portion 30c of the locking pin 30 penetrate through the base 1. Alternatively, the stacked body 8 may be formed by stacking the base 1, the latch 2, the sub-plate 5 in this order from the side closer to a workbench 900.

As shown in FIG. 5B, the small diameter portion 20c of the latch pin 20 and the small diameter portion 30c of the locking pin 30 are deformed by a compression tool (not shown) for rivets, etc. Thus, the stacked body 8 is fixed by the latch pin 20 and the locking pin 30.

In the present embodiment, since the cylinder portion 51 of the sub-plate 5 holds the torsion spring 4, it is possible to reduce the weight. In more detail, in case of, e.g., the vehicle hood lock device described in Patent Literature 1, since the torsion spring is held by the latch pin, the dimensions of the latch pin in the axial and radial directions need to be set according to the size of the torsion spring and the size of the latch pin is thus large. In addition, the latch pin is generally formed of iron to satisfy the locking strength required to maintain a restrained state of the striker by the latch. Therefore, an increase in the volume of the latch pin causes an increase in cost and an increase in the weight of the entire device.

On the other hand, in the present embodiment, since the cylinder portion 51 of the sub-plate 5 has a function of restricting movement of the cylindrical portion 40 of the torsion spring 4 and positioning the cylindrical portion 40 of the torsion spring 4, the latch pin 20 does not need to be designed according to the size of the torsion spring 4 and it is thus possible to reduce the dimensions of the latch pin 20 in the axial and radial directions. The volume of the latch pin 20 is thus reduced and it is thereby possible to reduce the weight of the vehicle hood lock device 100.

In addition, in the present embodiment, since the torsion spring 4 can be positioned without newly adding a component for holding the torsion spring 4, it is possible to reduce the weight without an increase in the number of components.

In addition, in the present embodiment, since the outer diameter of the head portion 20a of the latch pin 20 is smaller than the inner diameter of the cylindrical portion 40 of the torsion spring 4, it is possible to arrange the latch pin 20 radially inside the cylindrical portion 40. Furthermore, since the outer diameter of the head portion 20a of the latch pin 20 is smaller than the inner diameter of the first and second circumferential wall portions 511 and 512 of the cylinder portion 51 of the sub-plate 5, it is possible to house the latch pin 20 inside the cylinder portion 51.

In addition, in the present embodiment, since the gaps 5a and 5b are formed between the first and second circumferential wall portions 511 and 512, it is possible to minimize the volume of the wall portions, thereby contributing to weight reduction.

(Modification 1)

Figure 6:
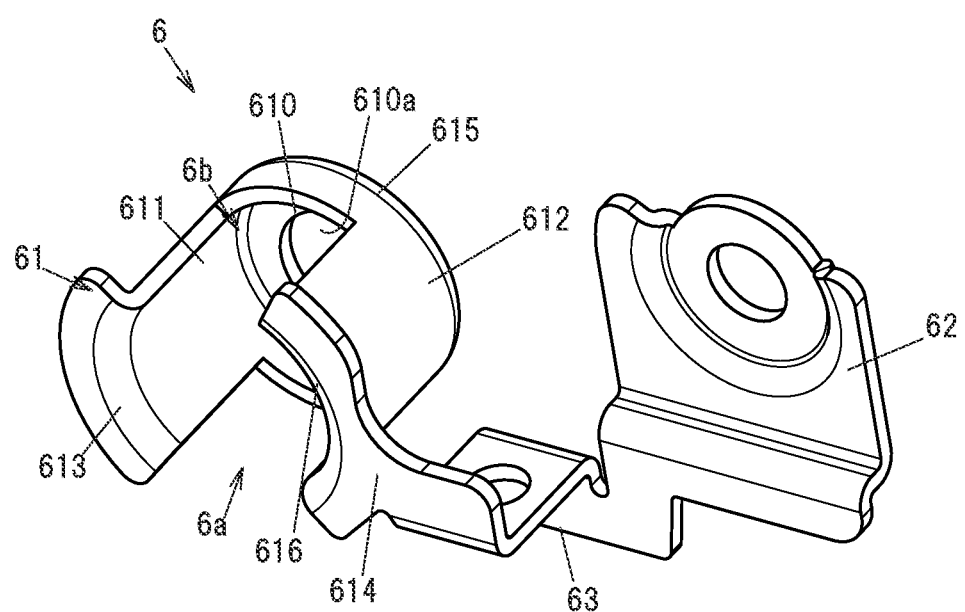
FIG. 6 is a perspective view showing a configuration of the sub-plate in Modification 1.
Figure 7:
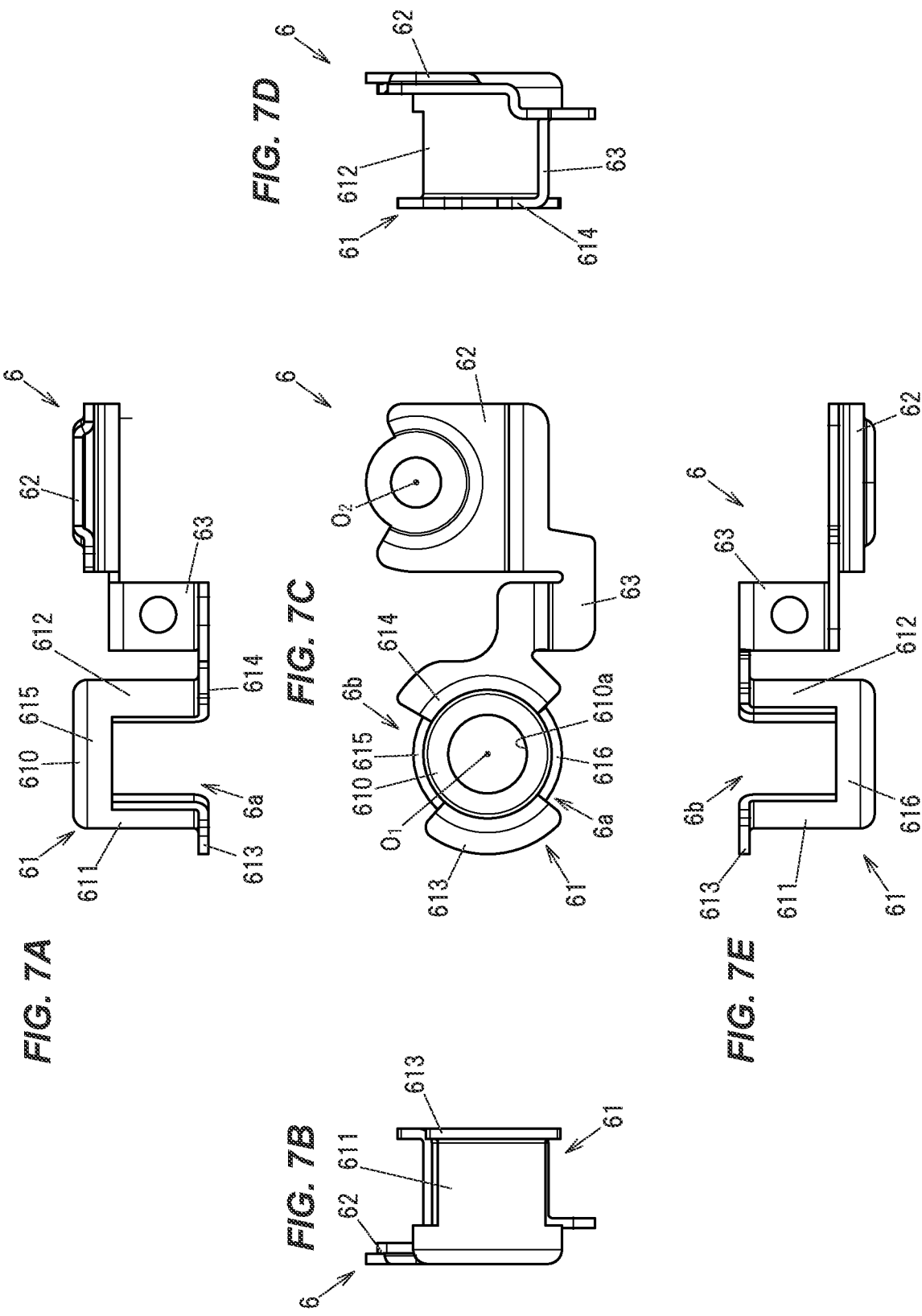
FIGS. 7A to 7E are plan views showing the configuration of the sub-plate in Modification 1.

Next, the vehicle hood lock device in Modification 1 will be described in reference to FIGS. 6 to 7E. FIG. 6 is a perspective view showing a configuration of a sub-plate 6 in Modification 1. FIGS. 7A to 7E are plan views showing the configuration of the sub-plate 6, wherein FIG. 7A is a top view, FIG. 7B is a left side view, FIG. 7C is a front view, FIG. 7D is a right side view and FIG. 7E is a bottom view.

The vehicle hood lock device in Modification 1 is configured in the same manner as the vehicle hood lock device 100 in the embodiment, except that the shape of the sub-plate 6 is different.

The sub-plate 6 in Modification 1 integrally has a cylinder portion 61 for holding the cylindrical portion 40 of the torsion spring 4, a flat plate portion 62 to be attached to the locking lever 3, and a coupling portion 63 coupling the cylinder portion 61 to the flat plate portion 62, in the same manner as the sub-plate 5 in the embodiment. The sub-plate 6 in Modification 1 has the same configuration as the sub-plate 5 in the embodiment, except that the shape of the cylinder portion 61 is different from that of the sub-plate 5 in the embodiment. Therefore, the cylinder portion 61 of the sub-plate 6 will be mainly described below.

The cylinder portion 61 of the sub-plate 6 integrally has a disc-shaped basal portion 610 in contact with the latch 2, first and second circumferential wall portions 611 and 612 rising up in the axial direction from an outer rim of the basal portion 610, first and second brim portions 613 and 614 protruding radially outward respectively from axial end portions of the first and second circumferential wall portions 611 and 612 on the opposite side to the basal portion 610, and third and fourth circumferential wall portions 615 and 616 provided between the first and second circumferential wall portions 611 and 612.

A through-hole 610a for inserting the latch pin 20 is formed on the basal portion 610 of the cylinder portion 61 of the sub-plate 6. The inner diameter of the through-hole 610a of the basal portion 610 is smaller than the outer diameter of the head portion 20a of the latch pin 20 and is larger than the outer diameter of the shaft portion 20b of the latch pin 20.

The first and second circumferential wall portions 611 and 612 are curved along the circumferential direction of the cylindrical portion 40 of the torsion spring 4 and are located inside the cylindrical portion 40. Each of the outer circumferential surfaces of the first and second circumferential wall portions 611 and 612 radially faces, or is in contact with, the inner circumferential surface of the cylindrical portion 40 of the torsion spring 4. This restricts the radial movement of the torsion spring 4. Gaps 6a and 6b are formed between the first circumferential wall portion 611 and the second circumferential wall portion 612 in the circumferential direction.

The third and fourth circumferential wall portions 615 and 616 are formed continuous with the first and second circumferential wall portions 611 and 612 along the circumferential direction of the first and second circumferential wall portions 611 and 612 and are provided at positions sandwiched between the first and second circumferential wall portions 611 and 612.

In addition, the third and fourth circumferential wall portions 615 and 616 have a smaller axial height than the axial height of the first and second circumferential wall portions 611 and 612. Furthermore, the outer circumferential surfaces of the third and fourth circumferential wall portions 615 and 616 radially face, or are in contact with, the inner circumferential surface of the cylindrical portion 40 of the torsion spring 4. This restricts the radial movement of the torsion spring 4 more reliably. The collapsing strength of the first and second circumferential wall portions 611 and 612 is also improved.

The first and second brim portions 613, 614 and the latch 2 sandwich the cylindrical portion 40 of the torsion spring 4 in the axial direction. Thus, the axial movement of the torsion spring 4 is restricted.

The same functions and effects as the vehicle hood lock device 100 in the embodiment can be obtained also in Modification 1. In other words, since the cylinder portion 61 of the sub-plate 6 holds the torsion spring 4, it is possible to reduce the weight. In addition, since the cylinder portion 61 has the third and fourth circumferential wall portions 615 and 616, it is possible to restrict the radial movement of the cylindrical portion 40 of the torsion spring 4 more reliably. In addition, the collapsing strength of the first and second circumferential wall portions 611 and 612 is also improved.

(Modification 2)

Figure 8:
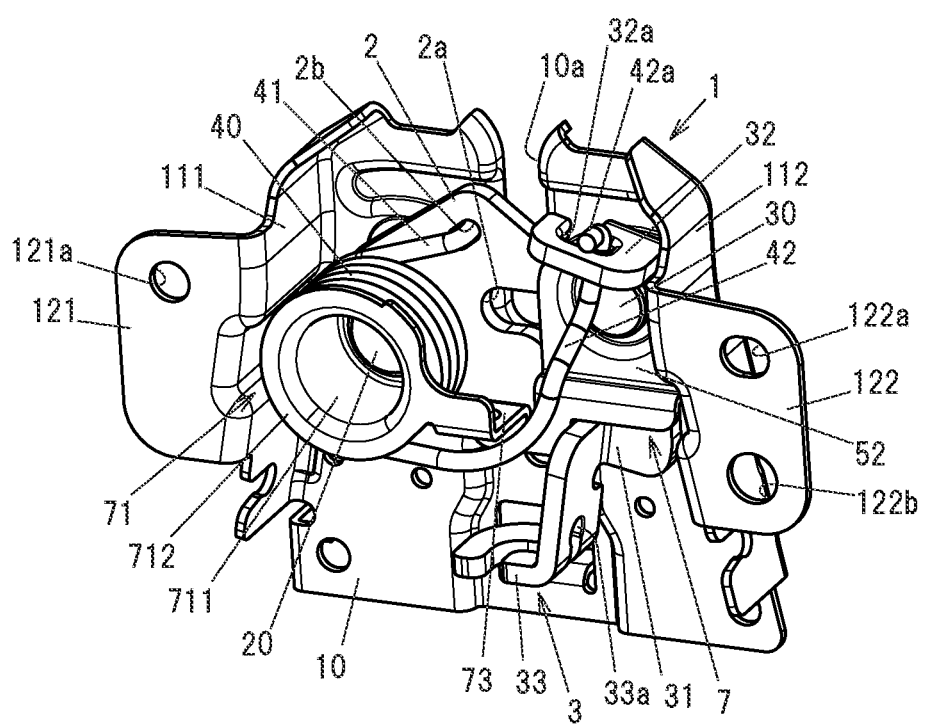
FIG. 8 is a perspective view showing a configuration of the vehicle hood lock device in Modification 2.
Figure 9:
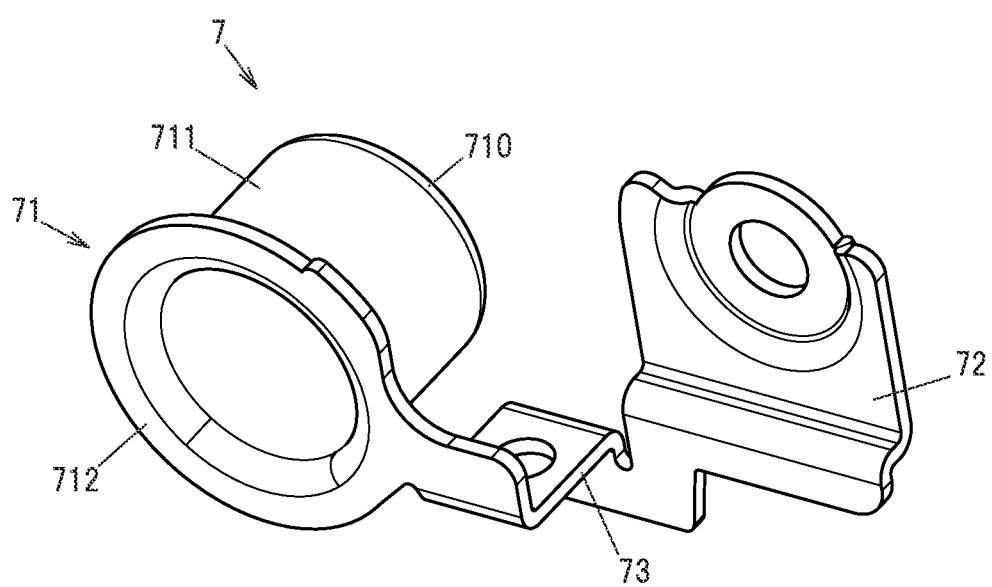
FIG. 9 is a perspective view showing a configuration of the sub-plate in Modification 2.

Next, the vehicle hood lock device in Modification 2 will be described in reference to FIGS. 8 to 10E. FIG. 8 is a perspective view showing a configuration of the vehicle hood lock device in Modification 2. FIG. 9 is a perspective view showing a configuration of a sub-plate 7 in Modification 2. FIGS. 10A to 10E are plan views showing the configuration of the sub-plate 7, wherein FIG. 10A is a top view, FIG. 10B is a left side view, FIG. 10C is a front view, FIG. 10D is a right side view and FIG. 10E is a bottom view The vehicle hood lock device in Modification 2 is configured in the same manner as the vehicle hood lock device 100 in the embodiment, except that the shape of the sub-plate 7 is different.

The sub-plate 7 in Modification 2 integrally has a cylinder portion 71 for holding the cylindrical portion 40 of the torsion spring 4, a flat plate portion 72 to be attached to the locking lever 3, and a coupling portion 73 coupling the cylinder portion 71 to the flat plate portion 72, in the same manner as the sub-plate 5 in the embodiment. The sub-plate 7 in Modification 2 has the same configuration as the sub-plate 5 in the embodiment, except that the shape of the cylinder portion 71 is different from that of the sub-plate 5 in the embodiment. Therefore, the cylinder portion 71 of the sub-plate 7 will be mainly described below.

The cylinder portion 71 of the sub-plate 7 integrally has a disc-shaped basal portion 710 in contact with the latch 2, a circumferential wall portion 711 rising up in the axial direction from an outer rim of the basal portion 710, and a brim portion 712 protruding radially outward from an axial end portion of the circumferential wall portion 711 on the opposite side to the basal portion 710.

A through-hole 710a for inserting the latch pin 20 is formed on the basal portion 710 of the cylinder portion 71 of the sub-plate 7. The inner diameter of the through-hole 710a of the basal portion 710 is smaller than the outer diameter of the head portion 20a of the latch pin 20 and is larger than the outer diameter of the shaft portion 20b of the latch pin 20.

The circumferential wall portion 711 has a cylindrical shape and is located inside the cylindrical portion 40. In addition, the outer circumferential surface of the circumferential wall portion 711 radially faces, or is in contact with, the inner circumferential surface of the cylindrical portion 40 of the torsion spring 4. This restricts the radial movement of the torsion spring 4. That is, the cylinder portion 71 of the sub-plate 7 in Modification 2 is different from the sub-plate 5 of the embodiment and the sub-plate 6 of Modification 1 in that the circumferential wall portion 711 is formed all the way around in the circumferential direction of the cylindrical portion 40 of the torsion spring 4.

The brim portion 712 and the latch 2 sandwich the cylindrical portion 40 of the torsion spring 4 in the axial direction. Thus, the axial movement of the torsion spring 4 is restricted.

The same functions and effects as the vehicle hood lock device 100 in the embodiment can be obtained also in Modification 2. In other words, since the cylinder portion 71 of the sub-plate 7 holds the torsion spring 4, it is possible to reduce the weight.

Note that all combinations of the features described in the embodiments are not necessary to solve the problem of the invention. The invention can be appropriately modified and implemented without departing from the gist thereof. For example, although the first and second circumferential wall portions 511 and 512 of the cylinder portion 51 of the sub-plate 5 is located radially inside the cylindrical portion 40 of the torsion spring 4 in the embodiment, the first and second circumferential wall portions 511 and 512 may be located radially outside the cylindrical portion 40 of the torsion spring 4. In other words, the circumferential wall portions of the cylinder portion 51 of the sub-plate 5 may be provided so as to cover the outer circumferential surface of the cylindrical portion 40. The configuration of the vehicle hood lock device may be a mirror image of the configuration described in the embodiment, etc., hence, the directions described in the embodiment sometimes may not be always the case.

List of the Embodiments

Technical ideas understood from the above described embodiments will be described below citing the reference numerals, etc., used for the embodiment. However, each reference numeral described below is not intended to limit the constituent elements in the claims to the members, etc., specifically described in the embodiment.

[1] A vehicle hood lock device (100), comprising: a base (1) comprising an entry groove (10a) for entry of a striker (90); a latch (2) that pivots between a restraining position, where the striker (90) is restrained, and a release position, where the striker (90) is released; a locking lever (3) engaging the latch (2) and holding the latch (2) in the restraining position; a torsion spring (4) generating an elastic force for causing the latch (2) to pivot in a direction toward the release position; and a sub-plate (5, 6, 7) fixed to the base (1) by a latch pin (20) supporting the latch (2) and a locking pin (30) supporting the locking lever (3) so that the latch (2) and the locking lever (3) are sandwiched between the sub-plate (5, 6, 7) and the base (1), wherein the torsion spring (4) comprises a cylindrical portion (40) wound in a coiled configuration and first and second arm portions (41, 42) extended from the cylindrical portion (40), and the sub-plate (5, 6, 7) integrally comprises a basal portion (510, 610, 710) in contact with the latch (2), a circumferential wall portion (511, 512, 611, 612, 615, 616, 711) rising up from the basal portion (510, 610, 710) in a pivot axis direction of the latch (2), facing the cylindrical portion (40) in a radial direction thereof and restricting movement of the torsion spring (4) in the radial direction, and a brim portion (513, 514, 613, 614, 712) protruding outward in the radial direction from the circumferential wall portion (511, 512, 611, 612, 615, 616, 711) and restricting movement of the torsion spring (4) in the pivot axis direction.

[2] The vehicle hood lock device (100) defined by [1], wherein the latch pin (20) comprises a shaft portion (20b) inserted through a latch hole (10b) penetrating the base (1) and a head portion (20a) provided at one end of the shaft portion (20b) and having a larger diameter than the latch hole (10b), and an outer diameter of the head portion (20a) is smaller than at least an inner diameter of the cylindrical portion (40) of the torsion spring (4).

[3] The vehicle hood lock device (100) defined by [1] or [2], wherein the circumferential wall portion (511, 512, 611, 612, 615, 616, 711) of the sub-plate (5, 6, 7) is located inside the cylindrical portion (40) of the torsion spring (4) in the radial direction.

[4] The vehicle hood lock device (100) defined by [3], wherein the circumferential wall portion (711) of the sub-plate (7) is formed all the way around in a circumferential direction of the cylindrical portion (40) of the torsion spring (4).

[58] The vehicle hood lock device (100) defined by [3], wherein the circumferential wall portion (511, 512, 611, 612) of the sub-plate (5, 6) comprises a plurality of walls (511, 512, 611, 612), and gaps (5a, 5b, 6a, 6b) are formed between the plurality of walls (511, 512, 611, 612).

The invention claimed is:

1. A vehicle hood lock device, comprising:
a base comprising an entry groove for entry of a striker;
a latch that pivots between a restraining position, where the striker is restrained, and a release position, where the striker is released;
a locking lever engaging the latch and holding the latch in the restraining position;
a torsion spring generating an elastic force for causing the latch to pivot in a direction toward the release position; and
a sub-plate fixed to the base by a latch pin supporting the latch and a locking pin supporting the locking lever so that the latch and the locking lever are sandwiched between the sub-plate and the base,
wherein the torsion spring comprises a cylindrical portion wound in a coiled configuration and first and second arm portions extended from the cylindrical portion, and
wherein the sub-plate integrally comprises a basal portion in contact with the latch, at least one circumferential wall portion rising up from the basal portion in a pivot axis direction of the latch and facing the cylindrical portion of the torsion spring in a radial direction of the torsion spring when the torsion spring is assembled to the sub-plate, so as to restrict movement of the torsion spring in the radial direction, and at least one brim portion protruding outward in the radial direction from the at least one circumferential wall portion, thereby restricting movement of the torsion spring in the pivot axis direction when the torsion spring is assembled to the sub-plate.

2. The vehicle hood lock device according to claim 1, wherein the latch pin comprises a shaft portion inserted through a latch hole penetrating the base, so as to fix the sub-plate to the base, and a head portion provided at one end of the shaft portion and having a larger diameter than the latch hole, and an outer diameter of the head portion is smaller than at least an inner diameter of the cylindrical portion of the torsion spring.

3. The vehicle hood lock device according to claim 1, wherein the at least one circumferential wall portion of the sub-plate is located inside the cylindrical portion of the torsion spring in the radial direction when the torsion spring is assembled to the sub-plate.

4. The vehicle hood lock device according to claim 3, wherein the at least one circumferential wall portion of the sub-plate is formed all the way around in a circumferential direction of the cylindrical portion of the torsion spring when the torsion spring is assembled to the sub-plate.

5. The vehicle hood lock device according to claim 3, wherein the at least one circumferential wall portion of the sub-plate comprises a plurality of wall portions, and gaps are formed between the plurality of wall portions.

6. The vehicle hood lock device according to claim 2, wherein the at least one circumferential wall portion of the sub-plate is located inside the cylindrical portion of the torsion spring in the radial direction when the torsion spring is assembled to the sub-plate.

7. The vehicle hood lock device according to claim 6, wherein the at least one circumferential wall portion of the sub-plate is formed all the way around in a circumferential direction of the cylindrical portion of the torsion spring when the torsion spring is assembled to the sub-plate.

8. The vehicle hood lock device according to claim 6, wherein the at least one circumferential wall portion of the sub-plate comprises a plurality of wall portions, and gaps are formed between the plurality of wall portions.

* * * * *